United States Patent
Plocher et al.

(10) Patent No.: US 9,158,464 B2
(45) Date of Patent: Oct. 13, 2015

(54) SYSTEM AND METHOD FOR OBJECT INTEGRITY SERVICE

(71) Applicant: FutureWei Technologies, Inc., Plano, TX (US)

(72) Inventors: John Plocher, Belmont, CA (US); Ajit Verma, Los Altos, CA (US); James Hughes, Palo Alto, CA (US)

(73) Assignee: Futurewei Technologies, Inc., Plano, TX (US)

( * ) Notice: Subject to any disclaimer, the term of this patent is extended or adjusted under 35 U.S.C. 154(b) by 251 days.

(21) Appl. No.: 13/731,586

(22) Filed: Dec. 31, 2012

(65) Prior Publication Data

US 2014/0188817 A1 Jul. 3, 2014

(51) Int. Cl.
G06F 17/30 (2006.01)
G06F 3/06 (2006.01)
G06F 9/00 (2006.01)

(52) U.S. Cl.
CPC ............... G06F 3/0619 (2013.01); G06F 9/00 (2013.01); G06F 17/30153 (2013.01)

(58) Field of Classification Search
None
See application file for complete search history.

(56) References Cited

U.S. PATENT DOCUMENTS

| | | | |
|---|---|---|---|
| 7,395,537 B1 * | 7/2008 | Brown et al. ................ | 718/104 |
| 8,621,109 B2 * | 12/2013 | Matesan ..................... | 709/248 |
| 2007/0179931 A1 * | 8/2007 | Juby et al. ................... | 707/2 |
| 2010/0088271 A1 * | 4/2010 | Brixius et al. ............... | 707/609 |
| 2011/0320412 A1 * | 12/2011 | Hanson ....................... | 707/690 |
| 2013/0006927 A1 * | 1/2013 | Brockway et al. ........... | 707/610 |

* cited by examiner

*Primary Examiner* — Anh Tai Tran
(74) *Attorney, Agent, or Firm* — Slater & Matsil, L.L.P.

(57) ABSTRACT

An embodiment for object integrity service in a storage system includes generating a list of objects stored in a storage system, wherein the list of objects may list an unchecked object, and wherein the unchecked object is an object that has not been checked within a set time period, walking through the list of objects to identify the unchecked object, adding a task to a queue to check the unchecked object, and clearing the task from the queue by checking the unchecked object.

20 Claims, 3 Drawing Sheets

SYSTEM AND METHOD FOR OBJECT INTEGRITY SERVICE

TECHNICAL FIELD

The present invention relates generally to a system and method for object based data storage, and, in particular embodiments, to a system and method for object integrity checks.

BACKGROUND

Generally, massive storage systems are used to store large quantities of objects in a network environment These storage systems are typically designed to handle many billions of objects and tens to hundreds of petabytes of data. These storage systems may be implemented in datacenters, storage pools or storage clusters. As time passes and storage hardware degrades, the quality of the stored objects may degrade, and the objects may become corrupted.

In order to combat this data corruption, a storage system may store redundant copies of an object in the same or redundant datacenters. When the storage system detects a corrupted object, it may repair the object by, for example, replacing the corrupted object with an uncorrupted copy. As redundancy goes up, the data durability promise of a database/datacenter increases.

In storage systems, corrupted objects may be detected by reading and validating the objects. Attempting to read a corrupted object may result in an error, such as read error or parity/checksum/signature mismatch, and an error handler associated with the read activity can react as needed. For objects that are frequently accessed (read), the storage system may easily be kept apprised of that object's quality. However, many objects stored in the storage system may go unread for extended periods of time leaving these unread objects susceptible to silent data corruption. If silent data corruption is left undetected or unattended for extended periods of time, the corruption issues may become too numerous or too extensive to repair. For example, all the redundant copies of an object may become corrupted over a period time. Additionally, the build-up of undetected silent data corruption cases may cause the storage system to fail a service level agreement (SLA) between a client and a data storage service provider. Therefore, storage systems may include mechanisms to scan, check, and preserve the integrity of stored objects.

SUMMARY OF THE INVENTION

These and other problems are generally solved or circumvented, and technical advantages are generally achieved, by embodiments of the present invention, which provide an object integrity service for a storage system.

In accordance with an embodiment, a method for object integrity servicing includes generating a list of objects stored in a storage system, wherein the list of objects may list an unchecked object, and wherein the unchecked object is an object that has not been checked within a set time period, walking through the list of objects to identify the unchecked object, adding a task to a queue to check the unchecked object, checking the unchecked object, and clearing the task from the queue.

In accordance with another embodiment, a method for data integrity checks includes running an object integrity service (OIS) within a storage system, wherein the OIS is an offline process. Running the OIS includes maintaining a list of objects stored in the storage system and the time an object was last scanned, repeatedly visiting the list of objects to search for an object needing to be scanned, wherein an object needing to be scanned is an object having a time the object was last scanned that exceeds a set timeframe, generating a task in a message queue to scan the object needing to be scanned, performing the task in the message queue by scanning the object needing to the scanned for errors, and removing the performed task from the message queue.

In accordance with yet another embodiment, a storage system includes a processor; and a computer readable storage medium storing programming for execution by the processor, the programming includes instructions to run an object integrity service (OIS), wherein the OIS includes instructions to maintain a list of objects to be serviced, wherein the list tracks objects stored in the storage system, and a last service time of the objects stored, scan the list for an expired object, wherein the expired object is an object having a last service time past a set time period, place a service request for the expired object serviced in a message queue, and fulfill the service request in the message queue by servicing the expired object

BRIEF DESCRIPTION OF THE DRAWINGS

For a more complete understanding of the present invention, and the advantages thereof, reference is now made to the following descriptions taken in conjunction with the accompanying drawing, in which.

DETAILED DESCRIPTION OF ILLUSTRATIVE EMBODIMENTS

The making and using of the embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

Existing storage systems may perform data scrubbing, which includes checking a system for corrupted or lost data. When data corruption or loss is found in a particular part of the system, that part is typically taken offline, repaired, and then brought back online. A disadvantage of this approach is that all data, including uncorrupted data, in that part of the system is inaccessible by clients while repairs are made. Furthermore, existing data scrubbing implementations may take up substantial system resources and/or bandwidth without any scaling mechanisms to account for overall storage system size. Storage system resources are finite and any resources taken up by housekeeping processes (e.g., data scrubbing) directly decreases the resources available to clients. Accordingly, a system and method for an object integrity service is provided to address these concerns.

An advantage of an embodiment is the object integrity service is a background process that does not directly affect a client's interaction with the storage system (i.e., the storage system is not taken offline while the object is repaired).

A further advantage of an embodiment is the system resources allocated to the object integrity service may be capped at a level that scales with overall system size.

Various embodiments are described with respect to preferred embodiments in a specific context, namely an object storage system that uses a distributed hash table (DHT) storage cluster. The invention may also be applied, however, to other storage systems that may or may not be compatible with Amazon Simple Storage Service (Amazon S3), and the like and may use other types of storage structures.

Figure 1:
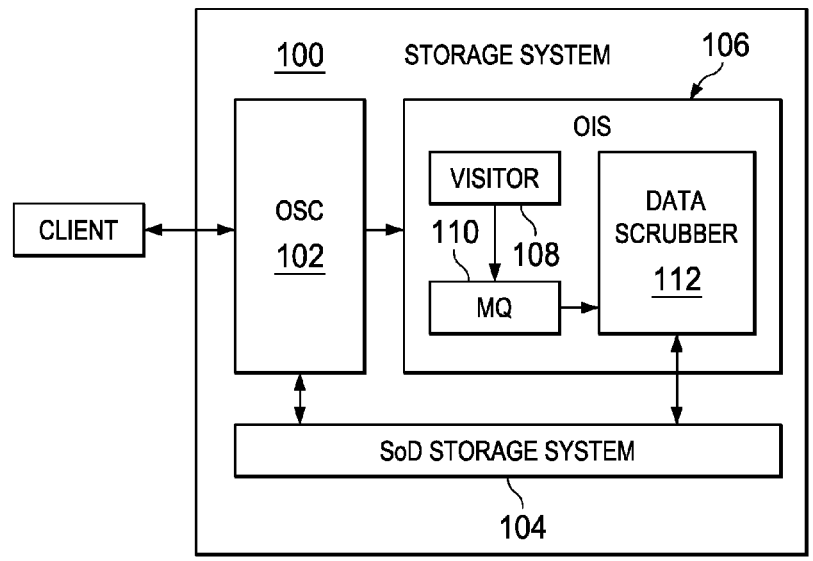
FIG. 1 is a block diagram of a storage system that may be used for implementing, for example, the devices and methods described herein, in accordance with an embodiment.

FIG. 1 illustrates a block diagram of a portion of a data storage system including storage system 100 according to an embodiment. Objects in storage system 100 may be stored in a distributed hash table (DHT), a column store, a NoSQL database, etc. that uses magnetic hard drive or solid state drive although other data structures for storing objects may be used. Clients may send objects for storage in storage system 100 as a stream of data over a network (not shown). An object storage controller (OSC) 102 receives these data streams and puts them into a storage subsystem self-organizing disk (SoD) 104. SoD 104 may be a storage cluster or storage node in a DHT implementation. OSC 102 may use metadata to associate the data with object names. This metadata may also be stored in SoD 104. The client may send requests to storage system 100 to perform specific tasks (e.g., to get, put, or delete an object). OSC 102 decodes and authenticates a request, interacts with SoD 104 and other components (not shown) to perform the desired task, and returns any results to the client.

Storage system 100 may comprise enough redundancies to achieve a data durability promise of six-nines (99.9999% durability or 0.0001% chance of failure) in its architecture. However, other data durability promises may also exist, for example, a durability promise of eleven-nines (99.999999999% durability) may be achieved in a storage system using multiple redundant and geographically isolated datacenters.

In order to maintain a certain data durability promise, objects stored in storage system 100 may be periodically scanned for integrity and fixed if any issues are found. The time period between scans is selected so that any silent data corruption issues are detected before they become too numerous to repair (i.e., before the probability of simultaneous failures of all the redundancies makes recovery impossible). In an embodiment with storage system 100 having a data durability promise of eleven-nines, the time period between object scans may be between two to four months. In other embodiments, however, the time period between scans may be longer or shorter depending on the data durability promise requirements of an embodiment (e.g., a longer time period may be selected for embodiments requiring a lower data durability promise).

In an embodiment, object integrity service (OIS) 106 (including visitor 108, message queue (MQ) 110, and data scrubber (DS) 112) scans and fixes corrupt/lost objects in storage system 100. When OSC 102 adds an object to SoD 104, OSC 102 may also inform OIS 106 of the new object's existence. Therefore, OIS 106 maintains a working list of all objects currently being stored in storage system 100. Deleted objects may be periodically removed from this list. However, the list may also include some deleted objects. For example, storage system 100 may support the recovery of certain deleted objects. These un-deletable objects would be kept in the list and maintained by OIS 106 in the same manner as a normal object.

Visitor 108 continuously walks through this list of stored objects to find any objects that may need scanning (i.e., objects that have not been scanned within a set time period) and adds these objects as tasks to MQ 110. DS 112 receives these tasks from MQ 110, and DS 112 then performs the tasks within SoD 104 (i.e., DS 112 scans an object for integrity and fixes any issues found). An embodiment may use multiple independent and redundant message queues to protect against message queue failure and to provide horizontal scaling across multiple OIS instances.

Once an object is scanned, OIS 106 records the scan time for that object for later use in a subsequent visitor walk-through. For new objects in storage system 100, the scan time is set as the time when the object is added to storage system 100. An advantage of this embodiment is that visitor 108 uses fewer system resources walking through a list looking for last scan time than a data scrubber would use scanning each object in SoD 104. As such, visitor 108 may run continuously from a theoretical prospective while using a minimal amount of system resources. In an embodiment, visitor 108 may be implemented as a series of nested loops walking through the list of stored objects at frequent intervals, for example, every six hours or daily.

In an embodiment, storage system 100 may require objects to be scanned every three months to maintain an acceptable data durability promise. In such an embodiment, visitor 108 may seek out objects that have not been scanned in the prior two months, giving objects a one month buffer period before the durability-induced deadline (i.e., the deadline before an object must be scanned to meet the storage system's data durability promise). In other embodiments, visitor 108 seeks out objects that have not been scanned in a different period (e.g., one month, three months, etc.), and visitor 108 may or may not allow for a buffer period. DS 112 may be implemented in a memory subsystem in storage system 100. DS 112 scans objects stored in SoD 104 for corruption or loss based on tasks assigned by MQ 106. When DS 112 finds a lost or corrupted object, it may repair the object. For example, DS 112 may replace the corrupted part of an object with an uncorrupted replica stored elsewhere in SoD 104 or in a separate datacenter. DS 112 may also repair an object by using erasure codes, wherein the corrupted or missing piece of original object may be reconstructed from the uncorrupted/readable portions of the corrupted object and associated parity information. In an embodiment, OIS 106 performs these scans and repairs without taking portions of SoD 104 offline. Any data stored in the same part of SoD 104 as the object undergoing a scan or repair will still be accessible by clients. Therefore, OIS 106 operates as a background process, having little direct impact on client interactions with storage system 100.

In an embodiment, DS 112 may be the same data scrubber used to implement read-repair (i.e., the scanning and repairing of objects) for both OIS 106 and other processes, including foreground processes. For example, OSC 102 may fulfill a request by a client, such as a "get object" request, to retrieve an object for the client. This active request to retrieve an object by the client may trigger an integrity check for the object. DS 112 may perform these types of actively triggered integrity checks in addition to fulfilling tasks for OIS 106.

In various embodiments, OIS 106 may also perform a number of other housekeeping tasks for storage system 100. OIS 106 may, for example, perform all or some of the following tasks: bucket content validation/synchronization; generation of summary roll up statistics for operations, audit, and maintenance (OA&M); erasure code parity and local/remote replica validation as requested by the client; check access control list of objects; check if objects have been de-duplicated and/or compressed; make copies to remote datacenters if requested by the client's SLA; and garbage collect objects that have been marked for deletion.

In an embodiment, the size of MQ 110 is capped at a configurable maximum system size so as to not overuse system resources. If MQ 110 is full, visitor 108 simply stops adding new tasks until DS 112 clears some of the pre-existing tasks. Visitor 108 may not add new tasks to a full MQ 110 even if it identifies additional objects that have not been scanned within the set time period (e.g., two months). Any missed objects will be identified in a subsequent walkthrough by visitor 108 and added to MQ 110 then. These missed objects may be added to MQ 110 as priority tasks on that subsequent walkthrough. Because the visitor walks through the list of objects frequently, missed objects may be queued for processing before the object durability deadline. In an embodiment, the MQ size may be limited to about 100 tasks although the MQ size may vary in alternate embodiments.

While FIG. 1 only shows OIS 106 having one visitor 108, MQ 110, and DS 112, alternate embodiments may have OIS 106 with multiple visitors, MQs, and DSs. An embodiment may include many independent MQs, with OIS distributing tasks across the independent MQs as objects get processed. The size of OIS 106 may be selected to balance scanning requirements with overall system resources. As system bandwidth is finite, the total scan resource's bandwidth size may be selected to scale linearly with the size of the overall system.

In an embodiment, the resource consumption of OIS 106 is restricted to 10% of storage system 100's maximum system load. For example, storage system 100 may exist in a network providing 4,000 Mb/s per petabyte of network input/output bandwidth onto a storage subsystem (e.g., SoD 104) and 20 MB/s of bandwidth per drive in the subsystem. Assuming a storage system 100 with a petabyte of overall space divided into a series of 2 TB drives, storage system 100 would contain roughly 500 drives. Therefore the system would have 10,000 MB/s (20 MB/s times 500 drives) of internal bandwidth and 4,000 MB/s of external bandwidth. The bandwidth allotted to OIS 106 would be capped at less than 400 MB/s, which is 10% of the smaller available bandwidth number (4,000 MB/s). The numbers given in this paragraph are arbitrary and for illustrative purposes only. Other embodiments may set various other bandwidth limitations, keeping in mind that the more bandwidth the overall object integrity system consumes, the less bandwidth is available to the client. Further, the bandwidth limitation on OIS 106 may be set to a default value (e.g., 10%) and may be adjustable with the changing needs of the network. An advantage of this embodiment is that the bandwidth consumed by an embodiment scales with system size and may not use up a substantial quantity of system resources.

In an embodiment OIS 106's bandwidth is limited by using servers with a low bandwidth network interface. Continuing with the bandwidth numbers from the example above, a system may have a 1 Gb/s network interface, limiting the impact on SoD cluster to that of the interface: 100 MB/s. An embodiment may allocate four of these servers per petabyte for OIS 106 and not exceed the bandwidth limitation. In an alternate embodiment, the MQs within OIS 106 may be used as a course throttling mechanism, with tasks being handed out at a metered rate. For example, a visitor may add 400 MB of objects to the MQ, and then pause for 1 second (or wait for the MQ to empty) before adding more tasks and still meet the bandwidth limitation goal. In yet another embodiment, OIS 106 may implement throttling using feedback, for example, a proportional-integral-derivative controller (PID) algorithm to automatically limit used bandwidth. OIS 106 may account for the time taken to perform tasks and object sizes to insert pauses and delays in processing loops and maintain resource usage under the desired bandwidth limit.

Figure 2:
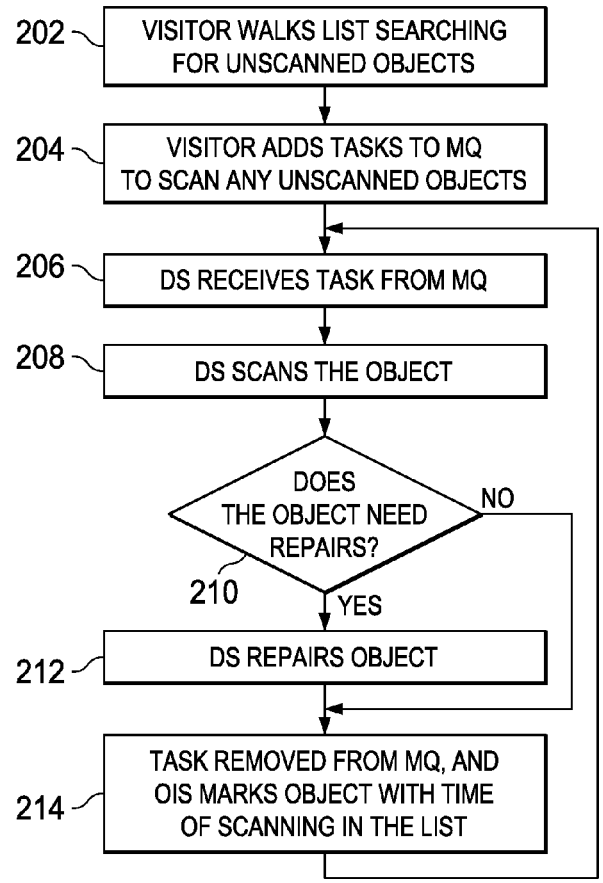
FIG. 2 is a flow diagram of an object integrity service in accordance with an embodiment.

FIG. 2 is a flow diagram of an OIS according to an embodiment. The OIS includes a list of all objects stored in a storage system. In step 202, a visitor walks the list of objects searching for unscanned objects. Unscanned objects are objects that have not been scanned within a set period of time (e.g., two or three months).

In step 204, the visitor adds tasks to a MQ for the OIS to scan these unscanned objects. In an embodiment, the MQ may be limited to a small size, and the visitor will stop adding new tasks to the MQ until existing tasks are cleared.

In step 206, a DS receives a task from the MQ. In step 208, the DS performs the task by scanning the object listed. In step 212, the DS determines if the object needs repairs (e.g., the object may be corrupted). If the object needs repairs, then in step 212, the DS repairs the object by, for example, replacing the corrupted object with an uncorrupted copy.

In Step 214, the task is cleared from the MQ, which clears up MQ space for additional tasks. The OIS marks the object as being scanned in the list with the time the scan took place. The DS then receives the next task in the MQ. While the DS carries out tasks from the MQ, the visitor may be continuously walking through the list and adding new tasks to the MQ in a theoretical sense.

Figure 3:
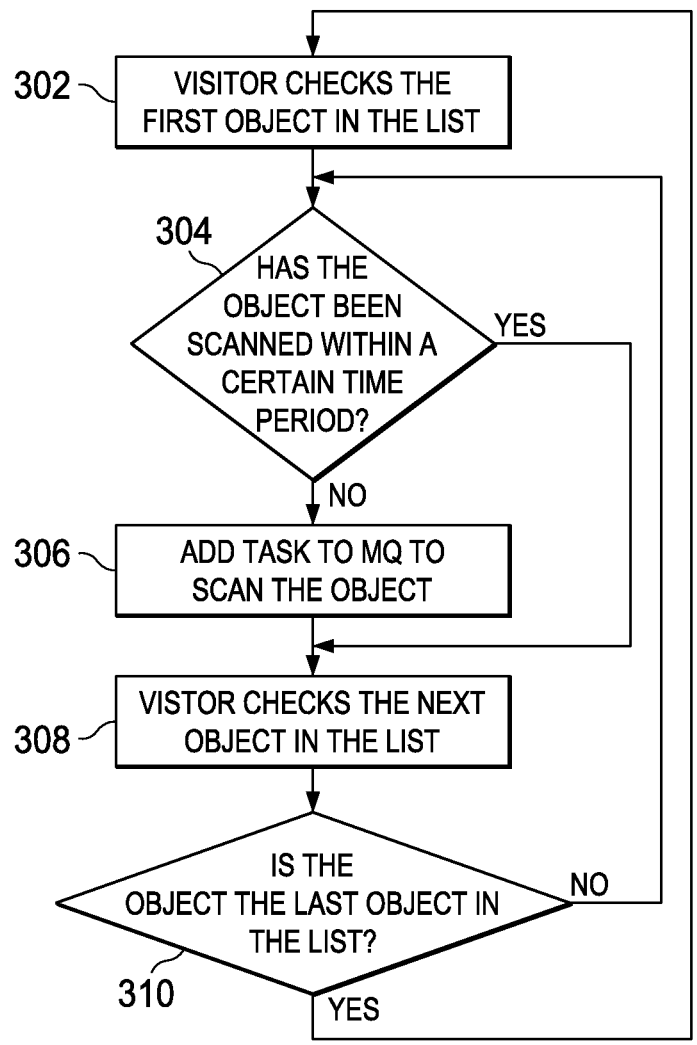
FIG. 3 is a flow diagram of a visitor function in accordance with an embodiment.

FIG. 3 is a flow diagram illustrating in greater detail how the visitor functions according to an embodiment. In step 302, the visitor checks the first object in the list of objects. In step 304, the visitor checks if that object has been scanned within a certain time period. If the object has not been scanned within the time period, then in step 306, the visitor adds a task to the MQ. If the object has been scanned within the time period, the visitor moves directly to step 308 where the visitor checks the next object in the list. In Step 310, if the next object is the last object in the list, the visitor moves back to check the first object in the list. Therefore, the visitor may run continuously to check objects in the list in a theoretical sense. Practically, the visitor may implement a delay between checking the last object and walking through the list again. For example, the visitor may only run once every six hours or once daily. An embodiment may have visitor process running on independent servers at staggered intervals to provide redundancy in case of server failures.

Figure 4:
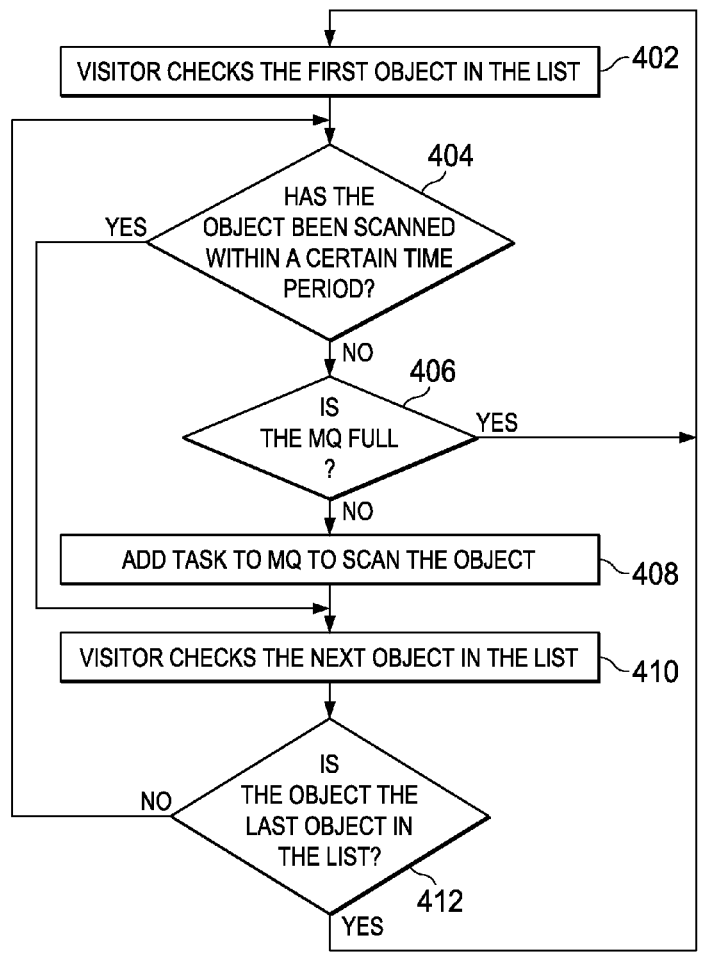
FIG. 4 is a flow diagram of a visitor function in accordance with an embodiment.

FIG. 4 is a flow chart illustrating an alternate embodiment of the visitor function. All the steps are identical to FIG. 3 except for an added step 406. In step 406, before the visitor adds a task to the MQ, the visitor checks to see if the MQ is full. If the MQ is not full, the visitor adds the task and continues operating. If the MQ is full, the visitor stops its current walkthrough of the list and returns to step 402. The visitor may continuously keep checking the start of the list until the MQ is no longer full. Alternatively, there may be a delay implemented between visitor walkthroughs. This delay may be the same delay implemented for cases when the visitor successfully completed a walkthrough of the list (e.g., a six hours or a day).

Figure 5:
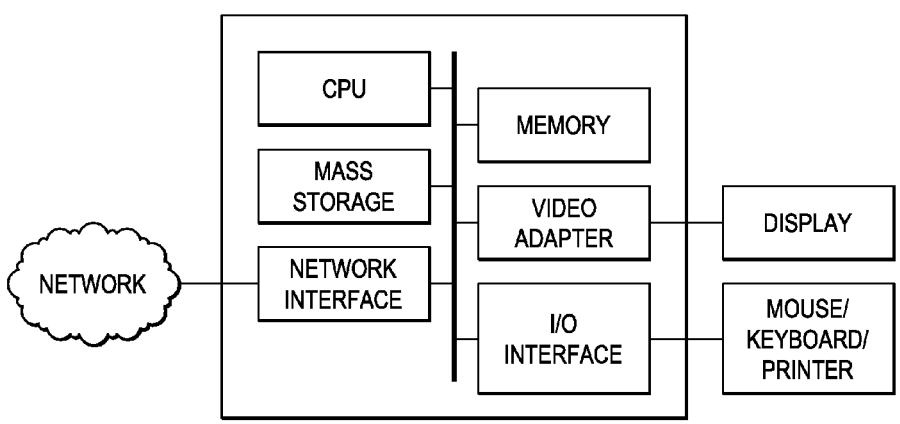
FIG. 5 is a block diagram illustrating a computing platform that may be used for implementing, for example, the devices and methods described herein, in accordance with an embodiment.

FIG. 5 is a block diagram of a processing system that may be used for implementing the devices and methods disclosed herein. Specific devices may utilize all of the components shown, or only a subset of the components, and levels of integration may vary from device to device. Furthermore, a device may contain multiple instances of a component, such as multiple processing units, processors, memories, transmitters, receivers, etc. The processing system may comprise a processing unit equipped with one or more input/output devices, such as a speaker, microphone, mouse, touchscreen, keypad, keyboard, printer, display, and the like. The processing unit may include a central processing unit (CPU), memory, a mass storage device, a video adapter, and an I/O interface connected to a bus.

The bus may be one or more of any type of several bus architectures including a memory bus or memory controller, a peripheral bus, video bus, or the like. The CPU may comprise any type of electronic data processor. The memory may comprise any type of system memory such as static random access memory (SRAM), dynamic random access memory (DRAM), synchronous DRAM (SDRAM), read-only memory (ROM), a combination thereof, or the like. In an embodiment, the memory may include ROM for use at boot-up, and DRAM for program and data storage for use while executing programs.

The mass storage device may comprise any type of storage device configured to store data, programs, and other information and to make the data, programs, and other information accessible via the bus. The mass storage device may comprise, for example, one or more of a solid state drive, hard disk drive, a magnetic disk drive, an optical disk drive, or the like.

The video adapter and the I/O interface provide interfaces to couple external input and output devices to the processing unit. As illustrated, examples of input and output devices include the display coupled to the video adapter and the mouse/keyboard/printer coupled to the I/O interface. Other devices may be coupled to the processing unit, and additional or fewer interface cards may be utilized. For example, a serial interface card (not shown) may be used to provide a serial interface for a printer.

The processing unit also includes one or more network interfaces, which may comprise wired links, such as an Ethernet cable or the like, and/or wireless links to access nodes or different networks. The network interface allows the processing unit to communicate with remote units via the networks. For example, the network interface may provide wireless communication via one or more transmitters/transmit antennas and one or more receivers/receive antennas. In an embodiment, the processing unit is coupled to a local-area network or a wide-area network for data processing and communications with remote devices, such as other processing units, the Internet, remote storage facilities, or the like.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method for data integrity checks comprising:
    running an object integrity service (OIS) on a processor within a storage system, wherein the OIS is a background process and wherein the running the OIS comprises:
        maintaining a list of objects stored in the storage system and a respective time each object was last scanned;
        repeatedly visiting, by a visitor process, the list of objects to search for an object needing to be scanned, wherein the object needing to be scanned has a respective time the object was last scanned that exceeds a set timeframe;
        generating, by the visitor process, a task in a message queue to scan the object needing to be scanned without scanning the object needing to be scanned for errors, wherein the message queue has a maximum size;
        performing, by a data scrubber process, the task in the message queue by scanning the object needing to be scanned for errors, wherein the data scrubber process runs independently from the visitor process;
        removing the task from the message queue after performing the task in the message queue; and
        returning to a start of the list of objects, by the visitor process, to search for one or more additional objects needing to be scanned when the message queue reaches the maximum size, wherein the one or more additional objects needing to be scanned each has a respective time the object was last scanned that exceeds the set timeframe.

2. The method of claim 1, wherein when the message queue reaches the maximum size, a subsequent task is not generated in the message queue until another task is removed.

3. The method of claim 1, wherein running the OIS further comprises repairing the object needing to be scanned if errors are found without affecting access to the storage system by a client.

4. The method of claim 3, further comprising limiting system resources used for running the OIS to an amount that scales with total system resources available to the storage system.

5. A method for object integrity service for a storage system comprising:
    generating, by a processor, a list of objects stored in the storage system, wherein the list of objects includes an unchecked object, and wherein the unchecked object is an object that has not been checked within a set time period;
    walking through the list of objects, by a first process, to identify the unchecked object without checking objects in the list of objects for integrity;
    adding a task to a queue, by the first process, to check the unchecked object without checking the unchecked object for integrity, wherein a used size of the queue is capped at a maximum size;
    checking, by a second process, the unchecked object for integrity, wherein the second process runs independently from the first process;
    after checking the unchecked object, clearing the task from the queue; and
    returning to a start of the list of objects, by the first process, to walk through the list of objects and identify one or more additional unchecked objects when the used size of the queue is at the maximum size, wherein the one or more additional unchecked objects are objects that have not been checked within the set time period.

6. The method of claim 5, further comprising, after clearing the task from the queue, marking the unchecked object in the list as being checked with a time of the checking.

7. The method of claim 5, wherein checking the unchecked object is performed without taking offline a portion of the storage comprising the unchecked object.

8. The method of claim 5, wherein walking through the list of objects is performed repeatedly at a frequent interval.

9. The method of claim 5, wherein a new task is only added to the queue if adding the new task does not increase the used size of the queue past the maximum size.

10. The method of claim 5, wherein the set time period is about two months or about three months.

11. The method of claim 1 further comprising while checking, by the second process, the unchecked object for integrity, continuing to walk through the list of objects, by the first process, to identify the one or more additional unchecked objects without checking the one or more additional unchecked object for integrity.

12. The method of claim 5, wherein checking the unchecked object comprises scanning the unchecked object for errors and fixing any errors found.

13. The method of claim 12, wherein fixing any errors found comprises replacing the unchecked object with an error free copy of the unchecked object.

14. A storage system comprising:
a processor; and
a computer readable storage medium storing programming for execution by the processor, the programming including instructions to run an object integrity service (OIS), wherein the OIS comprises instructions to:
maintain a list of objects to be serviced, wherein the list tracks:
objects stored in the storage system; and
previous service time of each object stored;
scan, by a first process, the list for an expired object, wherein the expired object has a previous service time earlier than a set time period;
place, by the first process, a service request for the expired object serviced in a message queue without fulfilling the service request, wherein the message queue has a maximum size;
fulfill, by a second process, the service request in the message queue by servicing the expired object, wherein the first process and the second process run independently; and
return to a start of the list, by the first process, to search for one or more additional expired objects when the message queue reaches the maximum size, wherein the one or more additional expired objects each has a previous service time earlier than the set time period.

15. The storage system of claim 14, wherein the instructions to fulfill the service request by servicing the expired object comprises instructions to scan the expired object for fault and to repair the expired object when a fault is found.

16. The storage system of claim 14, wherein the OIS is a background process.

17. The storage system of claim 14, wherein system resources allocated to executing the instructions to run the OIS is limited to a set amount, wherein the set amount scales with overall system resources available to the storage system.

18. The storage system of claim 17, wherein the set amount is ten percent of the overall system resources available to the storage system.

19. The storage system of claim 17, wherein the OIS comprises further instructions to fulfill service requests from the message queue at a metered rate to limit resources used by the OIS.

20. The storage system of claim 17, wherein the OIS comprises further instructions to use a feedback controller to limit system resources used by the OIS.

* * * * *